US012684403B2

(12) United States Patent
Liu

(10) Patent No.: US 12,684,403 B2
(45) Date of Patent: Jul. 14, 2026

(54) INFORMATION SENDING METHOD AND INFORMATION SENDING APPARATUS

(71) Applicant: Beijing Xiaomi Mobile Software Co., Ltd.

(72) Inventor: Xiaofei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 413 days.

(21) Appl. No.: 18/554,601

(22) PCT Filed: Apr. 9, 2021

(86) PCT No.: PCT/CN2021/086265
§ 371 (c)(1),
(2) Date: Oct. 9, 2023

(87) PCT Pub. No.: WO2022/213390
PCT Pub. Date: Oct. 13, 2022

(65) Prior Publication Data
US 2024/0205729 A1 Jun. 20, 2024

(51) Int. Cl.
| | |
|---|---|
| *H04W 4/00* | (2018.01) |
| *H04W 8/00* | (2009.01) |
| *H04W 28/02* | (2009.01) |
| *H04W 48/18* | (2009.01) |

(52) U.S. Cl.
CPC ....... *H04W 28/0257* (2013.01); *H04W 8/005* (2013.01); *H04W 48/18* (2013.01)

(58) Field of Classification Search
CPC ....... H04W 28/02; H04W 8/00; H04W 48/18; H04W 28/0257; H04W 8/005

USPC .......................................................... 370/329
See application file for complete search history.

(56) References Cited

U.S. PATENT DOCUMENTS

| | | | | | |
|---|---|---|---|---|---|
| 9,408,111 | B2 * | 8/2016 | Elliott | ............... | H04W 36/0016 |
| 10,630,410 | B2 * | 4/2020 | Parkvall | .............. | H04L 65/1023 |
| 10,805,168 | B2 * | 10/2020 | Xu | ........................ | H04W 24/02 |
| 11,812,375 | B2 * | 11/2023 | Prabhakar | ............... | H04W 8/08 |
| 12,445,952 | B2 * | 10/2025 | Sivavakeesar | ........ | H04W 76/10 |
| 2015/0131612 | A1 * | 5/2015 | Elliott | ............... | H04W 36/0016 370/331 |
| 2017/0331577 | A1 * | 11/2017 | Parkvall | .................. | H04W 8/18 |
| 2018/0227873 | A1 * | 8/2018 | Vrzic | .................. | H04W 60/002 |
| 2018/0352491 | A1 * | 12/2018 | Shih | ................... | H04W 36/144 |
| 2019/0029065 | A1 * | 1/2019 | Park | ..................... | H04W 60/00 |

(Continued)

FOREIGN PATENT DOCUMENTS

| | | |
|---|---|---|
| CN | 106851589 A | 6/2017 |
| CN | 110326332 A | 10/2019 |

(Continued)

OTHER PUBLICATIONS

"Enhancement on RAN support of network slicing," Proceedings of the 3GPP TSG-RAN2 #111e, Xiaomi, R2-2007521, Aug. 17, 2020, Online Meeting, 4 pages.

(Continued)

*Primary Examiner* — Marceau Milord
(74) *Attorney, Agent, or Firm* — McCoy Russell LLP

(57) ABSTRACT

An information sending method includes: determining related information of a slice supported by a cell; and sending the related information to a non-access stratum by means of an access stratum.

20 Claims, 6 Drawing Sheets

Determine related information of a slice supported by a cell — S101

Determine an expected slice needed for a non-access stratum — S401

Send the related information to a non-access stratum by means of an access stratum, the related information at least including: whether a suitable cell supporting the expected slice exists in a cell where a terminal is currently located and a neighboring cell of the cell — S102

(56) References Cited

U.S. PATENT DOCUMENTS

| | | | | |
|---|---|---|---|---|
| 2019/0158360 | A1* | 5/2019 | Xu | H04W 24/02 |
| 2019/0268840 | A1 | 8/2019 | Chen | |
| 2019/0380104 | A1 | 12/2019 | Vrzic et al. | |
| 2020/0260330 | A1 | 8/2020 | Zhu et al. | |
| 2020/0296701 | A1 | 9/2020 | Park et al. | |
| 2021/0136675 | A1* | 5/2021 | Lee | H04W 48/16 |
| 2021/0352572 | A1* | 11/2021 | Li | H04W 76/18 |
| 2022/0225180 | A1* | 7/2022 | Chen | H04W 36/0055 |
| 2023/0092926 | A1* | 3/2023 | Fu | H04W 74/0833 |
| 2023/0121583 | A1* | 4/2023 | Basu Mallick | H04W 72/0453 |
| | | | | 370/329 |
| 2023/0156583 | A1* | 5/2023 | Murray | H04W 48/20 |
| | | | | 370/329 |
| 2023/0239774 | A1* | 7/2023 | Fu | H04W 48/16 |
| | | | | 370/329 |
| 2023/0262591 | A1* | 8/2023 | Ishii | H04W 48/20 |
| | | | | 370/331 |
| 2024/0015798 | A1* | 1/2024 | Cheng | H04W 48/18 |
| 2024/0306086 | A1* | 9/2024 | Sivavakeesar | H04W 48/18 |

FOREIGN PATENT DOCUMENTS

| | | | |
|---|---|---|---|
| CN | 110838927 | A | 2/2020 |
| CN | 111149387 | A | 5/2020 |
| CN | 112543491 | A | 3/2021 |
| WO | 2021047498 | A1 | 3/2021 |

OTHER PUBLICATIONS

"Discussion on Network Slicing's Impact on Cell (Re-)Selection," Proceedings of the 3GPP TSG-RAN WG2 Meeting #112 electronic, Convida Wireless, R2-2010065, Nov. 2, 2020, Online Meeting, 4 pages.

"Assistant information to enable UE fast access network slice," Proceedings of the 3GPP TSG-RAN WG2 Meeting #112 electronic, ITRI, R2-2009644, Nov. 2, 2020, Online Meeting, 5 pages.

"3rd Generation Partnership Project; Technical Specification Group RAN; NR; Study on enhancement of Radio Access Network (RAN) slicing," 3GPP TR 38.832 V1.0.0, (Release 17), Sections 5.1 and 7, Mar. 14, 2021, 30 pages.

* cited by examiner

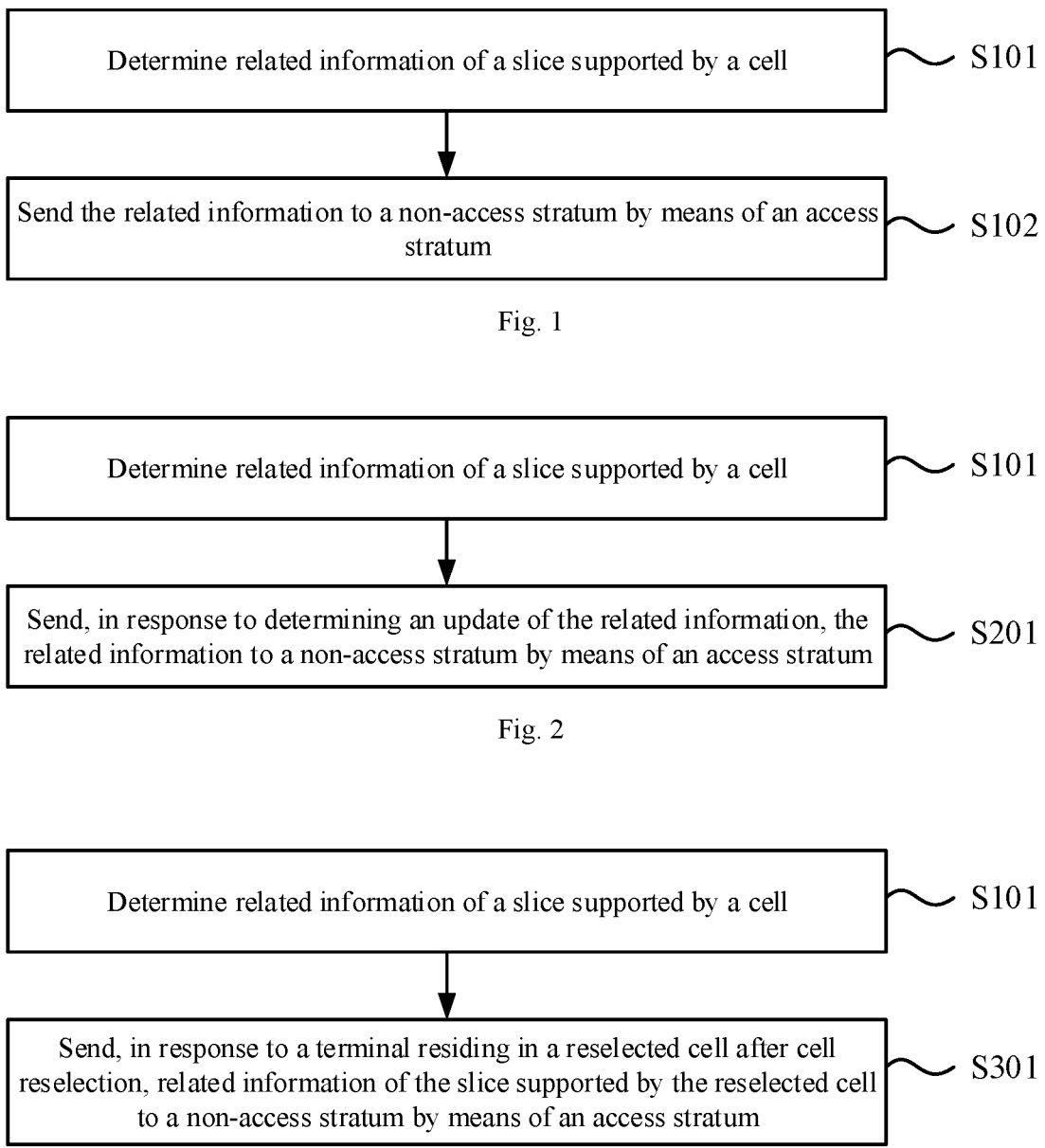

Determine related information of a slice supported by a cell ∼ S101

Send the related information to a non-access stratum by means of an access stratum ∼ S102

Fig. 1

Determine related information of a slice supported by a cell ∼ S101

Send, in response to determining an update of the related information, the related information to a non-access stratum by means of an access stratum ∼ S201

Fig. 2

Determine related information of a slice supported by a cell ∼ S101

Send, in response to a terminal residing in a reselected cell after cell reselection, related information of the slice supported by the reselected cell to a non-access stratum by means of an access stratum ∼ S301

Fig. 3

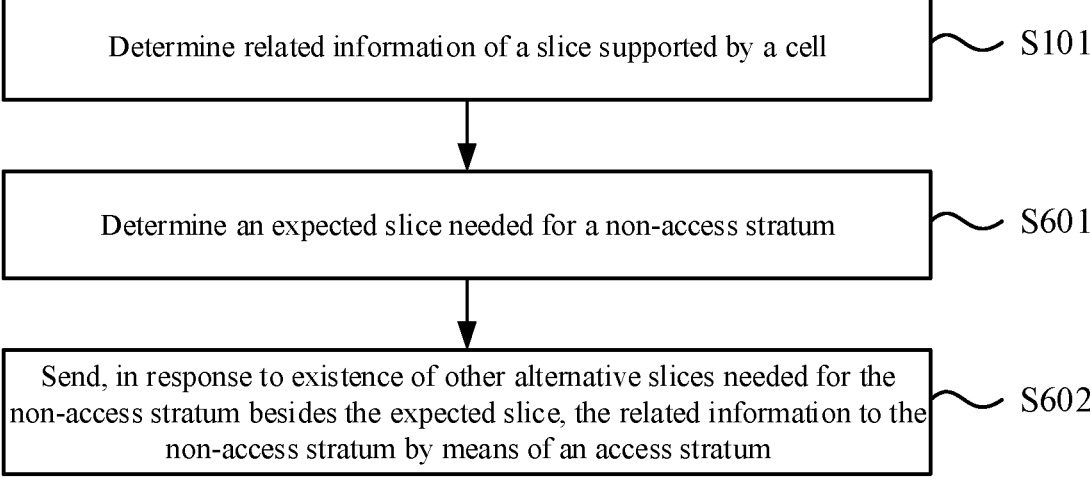

| Determine related information of a slice supported by a cell | S101 |
| Determine an expected slice needed for a non-access stratum | S601 |
| Send, in response to existence of other alternative slices needed for the non-access stratum besides the expected slice, the related information to the non-access stratum by means of an access stratum | S602 |

Fig. 6

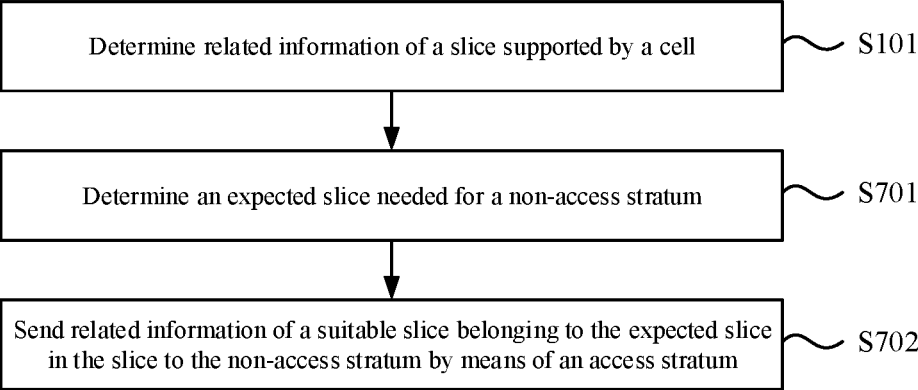

| Determine related information of a slice supported by a cell | S101 |
| Determine an expected slice needed for a non-access stratum | S701 |
| Send related information of a suitable slice belonging to the expected slice in the slice to the non-access stratum by means of an access stratum | S702 |

Fig. 7

INFORMATION SENDING METHOD AND INFORMATION SENDING APPARATUS

CROSS REFERENCE TO RELATED APPLICATION

The present application is a U.S. National Phase of International Application No. PCT/CN2021/086265 entitled "INFORMATION SENDING METHOD AND INFORMATION SENDING APPARATUS," and filed on Apr. 9, 2021. The entire contents of the above-listed application are hereby incorporated by reference for all purposes.

BACKGROUND

Network slices may provide a complete end-to-end virtual network for specific users. Differentiated services are conveniently provided for users with different service needs (functions such as latency, reliability, capacity, and isolation, etc) by dividing network resources into a plurality of network slices.

SUMMARY

According to a first aspect of the examples of the disclosure, an information sending method is provided and performed by a terminal, and the method including:

determining related information of a slice supported by a cell; and sending the related information to a non-access stratum by means of an access stratum.

According to a second aspect of the examples of the disclosure, an information sending method is provided and performed by a base station, and the method including:

sending related information of a slice supported by a cell corresponding to the base station to a terminal.

According to a third aspect of the examples of the disclosure, a terminal is provided and including:

a processor; and a memory configured to store a computer program, where when the computer program is executed by the processor, the computer program implements an information sending method suitable for a terminal.

According to a fourth aspect of the examples of the disclosure, a base station is provided and including:

a processor; and a memory configured to store a computer program, where when the computer program is executed by the processor, the computer program implements an information sending method suitable for a base station.

According to a fifth aspect of the examples of the disclosure, a computer readable storage medium is provided and configured to store a computer program, and when the computer program is executed by a processor, the computer program implements steps of an information sending method suitable for a terminal.

According to a sixth aspect of the examples of the disclosure, a computer readable storage medium is provided and configured to store a computer program, and when the computer program is executed by a processor, the computer program implements steps of an information sending method suitable for a base station.

BRIEF DESCRIPTION OF THE DRAWINGS

In order to more clearly illustrate the technical solution in the examples of the disclosure, the following is a brief introduction to the accompanying drawings needed to be used in the description of the examples. Obviously, the accompanying drawings described below are merely some examples of the disclosure, and those ordinarily skilled in the art may further obtain other accompanying drawings according to these accompanying drawings without creative labor.

FIG. 1 is a schematic flow diagram of an information sending method shown according to an example of the disclosure.

FIG. 2 is a schematic flow diagram of another information sending method shown according to an example of the disclosure.

FIG. 3 is a schematic flow diagram of yet another information sending method shown according to an example of the disclosure.

FIG. 6 is a schematic flow diagram of yet another information sending method shown according to an example of the disclosure.

FIG. 7 is a schematic flow diagram of yet another information sending method shown according to an example of the disclosure.

DETAILED DESCRIPTION

Figure 4:
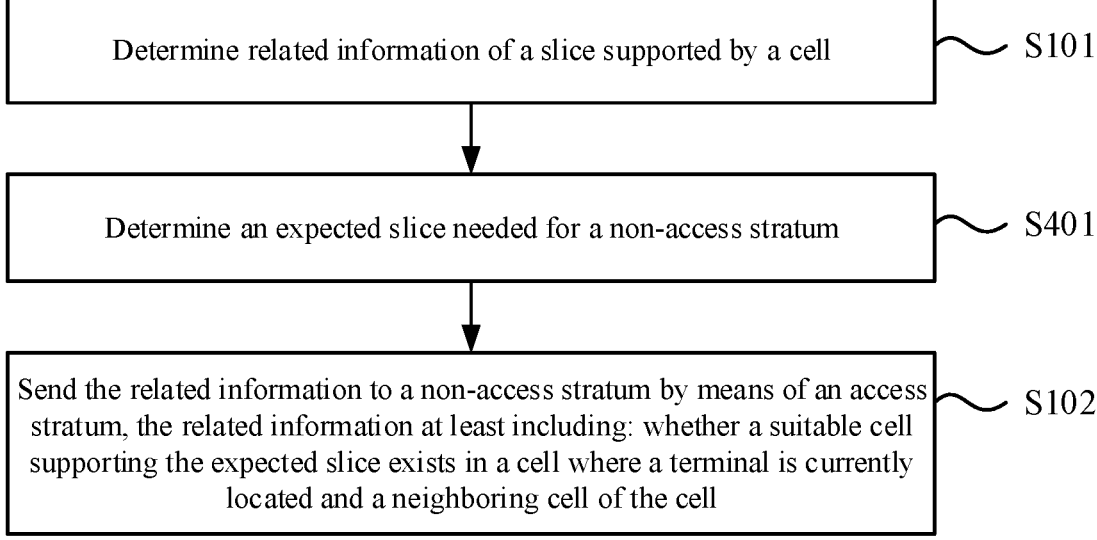
FIG. 4 is a schematic flow diagram of yet another information sending method shown according to an example of the disclosure.

The technical solutions of examples of the disclosure will be clearly and completely described below in conjunction with accompanying drawings in the examples of the disclosure, and obviously, the described examples are merely one part of the examples of the disclosure, not all of them. Based on the examples in the disclosure, all other examples obtained by those ordinarily skilled in the art without creative labor all fall within the scope of protection of the disclosure.

Terms used in the examples of the disclosure are just for the purpose of describing specific examples and are not aimed at limiting the examples of the disclosure. Words "one" and "the" of singular forms used in the examples of the disclosure and the appended claims are also aimed at including plural forms, unless that context clearly shows other meanings. It shall also be understood that terms "and/or" used in the disclosure refer to and include any or all possible combinations of one or more relevant listed items.

It shall be understood that although terms of first, second, third, etc. may be adopted to describe various pieces of information in the examples of the disclosure, these pieces of information are not limited to the terms. These terms are just used to distinguish the same type of information from one another. For example, under the condition of not departing from the scope of the examples of the disclosure, first information also may be called second information, and similarly, the second information also may be called the first information. Depending on the context, for example, the word "if" used here may be explained as "at the time of" or "when" or "in response to determining".

For the sake of simplicity and ease of understanding, the terms used in the disclosure to characterize a size relationship are "greater than" or "less than", "higher than" or "lower than". However, for those skilled in the art, it may be understood that the term "greater than" also covers the meaning of "greater than or equal to" and "less than" also covers the meaning of "less than or equal to"; and the term "high than" covers the meaning of "higher than or equal to", and "lower than" also covers the meaning of "lower than or equal to".

The disclosure relates to the technical field of communication, in particular to an information sending method, an information sending apparatus, a communication apparatus and a computer readable storage medium.

On the basis of a cell access mechanism currently, a non-access stratum (NAS) of a terminal merely selects, on the basis of a policy of the non-access stratum itself, an expected slice to indicate to an access stratum (AS), and the access stratum performs access on the basis of selecting a cell supporting the expected slice, and does not consider a condition of a cell supporting a slice in an actual environment of the terminal.

The access stratum performs access on the basis of selecting a cell supporting the expected slice, however, in the environment of the terminal, slices supported by the cell that the terminal may access are usually different, it may not be able to guarantee that the cell supporting the expected slice certainly exists in the cell that the terminal may access, if there is no cell supporting the expected slice, the terminal cannot access the cell, or even if the terminal accesses the cell, an ideal communication effect is difficult to obtain (for example, the accessed cell does not support the expected slice, is poor in signal quality, etc.).

In view of this, examples of the disclosure provide an information sending method, an information sending apparatus, a communication apparatus and a computer readable storage medium, to solve technical problems in the related art.

It shall be illustrated that the slice in all examples of the disclosure is short for a network slice. The network slice is composed of a radio access network (RAN) part and a core network (CN) part, and implementation of the network slice depends on a principle that flows of different slices are processed by different protocol data unit (PDU) sessions. A network may implement different network slices by means of scheduling and providing different L1/L2 configurations. Each slice may be composed of an S-NSSAI unique identifier, a slice/service type SST and a slice differentiator (SD), and network slice selection assistance information (NSSAI) includes one or more S-NSSAI.

FIG. 1 is a schematic flow diagram of an information sending method shown according to an example of the disclosure. The information sending method shown by the present example may be performed by a terminal, and the terminal includes but is not limited to a mobile phone, a tablet computer, a wearable device, a sensor, an internet of things device, and other communication apparatuses. The terminal may be used as a user device to communicate with a base station, and the base station includes but is not limited to a 4G base station, a 5G base station, a 6G base station and other base stations in a communication system.

As shown in FIG. 1, the information sending method may include the following steps:

in step S101, related information of a slice supported by a cell is determined; and in step S102, the related information is sent to a non-access stratum by means of an access stratum.

In an example, the terminal may determine the related information of the slice supported by the cell, where, the cell may be a cell able to be accessed when the terminal performs cell selection and cell reselection, for example, including a cell where the terminal is currently located and a neighboring cell of the cell where the terminal is currently located.

In an example, the terminal may determine the related information of the slice supported by the cell according to broadcast information of the cell, that is, the cell may broadcast the related information of the slice supported by the cell itself.

In addition to obtaining the related information in this way, the terminal may also obtain the related information in other ways, including, but not limited to, the following modes: taking the related information including an identifier of the slice supported by the cell as an example, a base station corresponding to the neighboring cell of the cell where the terminal is currently located may send an identifier of a slice supported by the neighboring cell to a base station corresponding to the cell where the terminal is currently located, and then the base station corresponding to the cell where the terminal is currently located sends the identifier of the slice supported by the neighboring cell and the identifier of the slice supported by the current cell to the terminal by means of a wireless access control stratum signaling.

According to the example of the disclosure, the terminal may determine the related information of the slice supported by the cell, such as the identifier of the slice, an identifier of the cell supporting the slice, and signal quality of the cell supporting the slice, and then may send the related information to the non-access stratum by means of the access stratum, so that the non-access stratum may determine the slice with reference to the related information and provide the slice to the access stratum, so that the terminal may access the cell supporting the slice provided by the non-access stratum, which facilitates the guarantee of a better communication effect.

In an example, the slice includes at least one of:

a slice supported by a cell where the terminal is currently located;

a remapping slice supported by the cell where the terminal is currently located;

a slice supported by a neighboring cell of the cell; and a remapping slice supported by the neighboring cell of the cell.

In an example, a cell in the related information of the slice supported by the cell determined by the terminal may be the cell where the terminal is currently located (may be a resident cell, and may also be a connected cell), and may also be the neighboring cell of the cell where the terminal is currently located.

The slice supported by the cell may be all slices supported by these cells, and may also be remapping slices supported by these cells. The remapping slice supported by the cell may be determined according to information broadcasted by the base station corresponding to the cell or proprietary signaling.

The remapping slice means that the cell does not support some slices A, but, services of these slices may be implemented by means of other slices B supported by the cell, then the slices A may be mapped to the slices B, the remapping slice includes the slices A and also includes slices B, and the slices A and the slices B both may be one or more.

In an example, the related information includes at least one of:

the identifier of the slice;

the identifier of the cell supporting the slice;

the signal quality of the cell supporting the slice (may be determined according to parameters like reference signal receiving power (RSRP);

whether a network allows to access the slice (may be determined according to universal access control barring information (Uacbarringinfo) or other information, issued by the base station, used for indicating whether the network allows to access the slice; and a priority of the slice.

In an example, the non-access stratum may specifically determine the slice supported by each cell according to the identifier of the cell supporting the slice and the identifier of the slice supported by the cell. For example, a cell 1 supports a slice a and a slice c, and a cell 2 supports a slice a and a slice b.

In an example, the non-access stratum may determine the slice according to the signal quality of the cell supporting the slice and provide the slice to the access stratum.

For example, the non-access stratum may preferentially select the slice supported by the cell with the best signal quality as the expected slice of the non-access stratum and provide it to the access stratum, so that when the access stratum accesses the cell on the basis of the expected slice provided by the non-access stratum, the access stratum may access the cell with the best signal quality, which facilitates the guarantee of the good communication effect.

For example, before receiving the related information, the non-access stratum has determined the expected slice, then, an essential slice that needs the cell to support may be determined in the expected slice, so that according to the signal quality from high to low, the cell supporting the necessary slice is determined in the cell according to the related information, and the slice supported by the determined cell with the best signal quality that supports the necessary slice is provided to the access stratum, so that when the access stratum accesses the cell, the access stratum may select the cell with the signal quality as good as possible from the cell supporting the necessary slice to access, which facilitates the guarantee of the good communication effect.

In an example, according to whether the network allows to access the slice, when the non-access stratum determines the expected slice needed to be provided to the access stratum, it may be avoided that the expected slice contains the slice not allowed by the network to be accessed, and avoided that the slice supported by the cell accessed by the access stratum is the slice not allowed to be accessed by the network, and the slice cannot provide a corresponding service for the terminal, and affects the communication effect of the terminal.

In an example, the non-access stratum may determine the slice according to the priority of the slice and provide the slice to the access stratum. The priority may be sent to the non-access stratum in a case of the cell supporting a plurality of slices, in a case of the cell merely supporting one slice, the priority may not be set for the slice, or even the priority is set, the priority may also not have to be carried in the related information to be sent to the non-access stratum.

For example, the non-access stratum may select a specified number of slices according to the priority from high to low as expected slices of the non-access stratum to provide these to the access stratum, so that when the access stratum accesses the cell on the basis of the expected slices provided by the non-access stratum, the access stratum may access the cell supporting the slice with a higher priority, which facilitates the guarantee of the good communication effect.

In an example, the priority of the slice is determined on the basis of at least one of:

an indication of a base station;

a quantity of cells supporting the slice; and signal quality of the cell supporting the slice.

In an example, the priority of the slice may be indicated by the base station, for example, the base station may determine the higher the priority of the slice that may provide a better service to the terminal, or the higher the priority of the slice that is more likely to provide a service to the terminal.

In an example, the priority of the slice may also be determined by the terminal itself, may be determined according to the quantity of cells supporting the slice and may also be determined according to the signal quality of the cell supporting the slice.

For example, the larger the quantity of cells that support the slice, the higher the priority of the slice, the non-access stratum indicates the slice with the higher priority to the access stratum, so that the access stratum may have more cells supporting the slice to select, which facilitates selecting of the cell with relatively good communication quality to access.

For example, the better the signal quality of the cell supporting the slice, the higher the priority of the slice, the non-access stratum indicates the slice with the higher priority to the access stratum, so that the access stratum may preferentially select the cell with the better signal quality, which facilitates the guarantee of the relatively good communication effect.

FIG. 2 is a schematic flow diagram of another information sending method shown according to an example of the disclosure. As shown in FIG. 2, sending related information to a non-access stratum by means of an access stratum includes:

in step S201, the related information is sent to the non-access stratum by means of the access stratum in response to determining an update of the related information.

In an example, a terminal may compare newly-determined related information with previously-determined related information. For example, the terminal may periodically determine the related information, and then new periodically-determined related information may be compared with related information determined in the last period; and for example, the terminal redetermines the related information after the accessed cell is changed, and then related information determined after a new cell is accessed may be compared with related information determined when an original cell is accessed.

In a case of the newly-determined related information being different from the previously-determined related information, it may be determined that the related information is updated, and then, the related information may be sent to the non-access stratum through the access stratum, so as to ensure that the non-access stratum is able to determine related information of the slice newly supported by the cell in an environment where the terminal is currently located.

FIG. 3 is a schematic flow diagram of yet another information sending method shown according to an example of the disclosure. As shown in FIG. 3, sending related information to a non-access stratum by means of an access stratum includes:

in step S301, related information of a slice supported by a reselected cell is sent to the non-access stratum by means of the access stratum in response to a terminal residing in the reselected cell after cell reselection.

In an example, after the terminal performs cell reselection, the terminal resides in the reselected cell (may be different from a resided cell before cell reselection), in the case, the cell that the terminal may access when the terminal performs cell selection and cell reselection again is the reselected cell (the resided cell after reselection and a neighboring cell of the cell), and then the terminal needs to determine related information of the slice of the reselected cell.

The reselected cell is generally different from the cell (the resided cell before reselection and the neighboring cell of the cell) before reselection, so that related information of a slice supported by the cell before reselection is also generally different from related information of a slice supported by the reselected cell, so that when the terminal resides in the reselected cell, the terminal may send the related information of the slice supported by the reselected cell to the non-access stratum by means of the access stratum, so as to ensure that the non-access stratum is able to determine related information of the slice newly supported by the cell in the environment where the terminal is currently located.

It shall be illustrated that other conditions of sending the related information to the non-access stratum by means of the access stratum may also be set according to needs in addition to the conditions in the above two examples, for example, it may set that the access stratum periodically sends the related information to the non-access stratum, and the related information may also be obtained periodically; and the related information may also be sent to the non-access stratum in a case of receiving a request reported by the non-access stratum.

FIG. 4 is a schematic flow diagram of yet another information sending method shown according to an example of the disclosure. As shown in FIG. 4, the method further includes:

in step S401, an expected slice needed for a non-access stratum is determined.

The related information at least includes: whether a suitable cell supporting the expected slice exists in a cell where a terminal is currently located and a neighboring cell of the cell.

In an example, the non-access stratum may determine the needed expected slice according to its own needs and indicate the needed expected slice to the access stratum. For example, the non-access stratum may determine the slice that may provide corresponding services for the business as the expected slice according to the business that needs to be performed.

In this case, when the access stratum performs cell selection or cell reselection, the selected cell needs to support the expected slice. In the general case, the cell that may perform cell selection or cell reselection is the cell where the terminal is currently located and the neighboring cell, so that according to the slice supported by the cell where the terminal is currently located and the neighboring cell, the suitable cell that supports the expected slice is determined in the current cell as well as in the neighboring cell, and whether the suitable cell exists is indicated in the related information.

The expected slice may include one or more slices, and supporting the expected slice may refer to supporting all the slices in the expected slice.

The non-access stratum may indicate the access stratum to select the cell to access according to the expected slice in a case of determining existence of the suitable cell, so that the access stratum may select the suitable cell to access. The non-access stratum may still indicate the access stratum to select the cell to access according to the expected slice in a case of determining inexistence of the suitable cell, so that the access stratum may select the cell supporting the largest number of slices in the expected slice to access, or, the non-access stratum may change the expected slice, so that the changed expected slice may be supported by at least one cell of the cell where the terminal is currently located and the neighboring cell, and the terminal selects the cell able to support the change expected slice to access.

Figure 5:
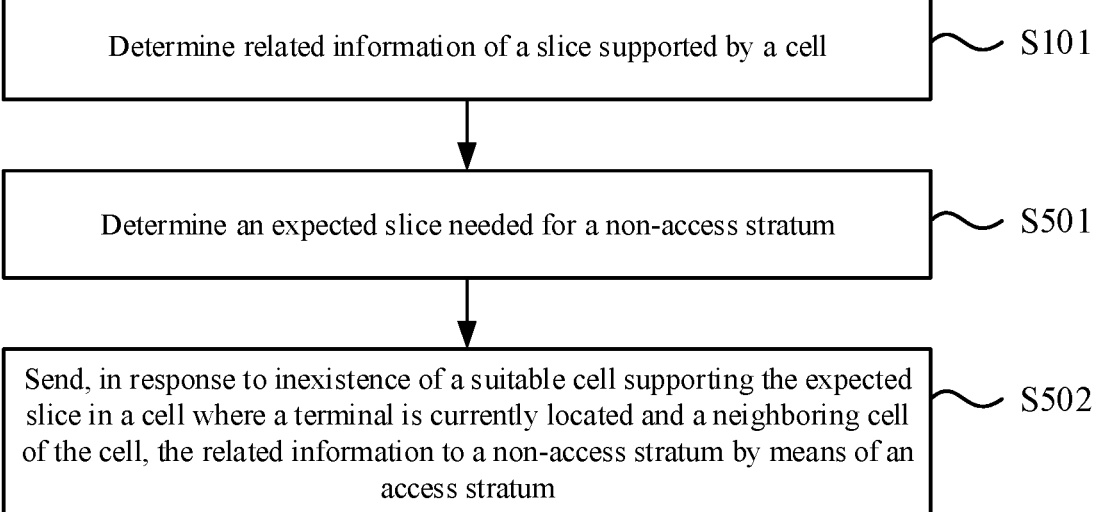
FIG. 5 is a schematic flow diagram of yet another information sending method shown according to an example of the disclosure.

FIG. 5 is a schematic flow diagram of yet another information sending method shown according to an example of the disclosure. As shown in FIG. 5, the method further includes:

in step S501, the expected slice needed for a non-access stratum is determined; and sending related information to the non-access stratum by means of an access stratum includes:

in step S502, the related information is sent to the non-access stratum by means of the access stratum in response to inexistence of a suitable cell supporting the expected slice in a cell where a terminal is currently located and a neighboring cell of the cell.

In an example, the non-access stratum may determine the needed expected slice according to its own needs and indicate the needed expected slice to the access stratum. For example, the non-access stratum may determine the slice that may provide corresponding services for the business as the expected slice according to the business that needs to be performed.

In this case, when the access stratum performs cell selection or cell reselection, the selected cell needs to support the expected slice. In the general case, the cell that may perform cell selection or cell reselection is the cell where the terminal is currently located and the neighboring cell, so that the suitable cell supporting the expected slice is determined in the current cell as well as in the neighboring cell according to the slice supported by the cell where the terminal is currently located and the neighboring cell.

If no suitable cell exists, that is to say, there is no cell able to support the expected slice in the cell where the terminal is currently located and the neighboring cell, and if the cell is selected according to the expected slice to access, the accessed cell cannot provide services of part or all slices in the expected slice, which affects a communication effect. As a result, the terminal may send the related information to the non-access stratum in this case, so that the non-access stratum determines the slice able to be supported by each cell in the cell where the terminal is currently located and the neighboring cell, so that the non-access stratum may change the expected slice, the changed expected slice may be supported by at least one cell in the cell where the terminal is currently located and the neighboring cell, and the terminal selects the cell able to support the changed expected slice to access.

FIG. 6 is a schematic flow diagram of yet another information sending method shown according to an example of the disclosure. As shown in FIG. 6, the method further includes:

in step S601, an expected slice needed for a non-access stratum is determined; and sending related information to the non-access stratum by means of an access stratum includes:

in step S602, the related information is sent to the non-access stratum by means of the access stratum in response to existence of other alternative slices needed for the non-access stratum besides the expected slice.

In an example, the non-access stratum may determine the needed expected slice according to its own needs and indicate the needed expected slice to the access stratum. For example, the non-access stratum may determine the slice that may provide corresponding services for the business as the expected slice according to the business that needs to be performed.

The non-access stratum may determine not only the expected slice, but also other alternative slices and informs the access stratum whether other alternative slices exist, for example, whether other alternative slices exist may be indicated by means of 1-bit information.

The other alternative slices are also slices needed for the non-access stratum, but have a lower priority than the expected slice, for example, the other alternative slices are not as effective as the expected slice in providing services for the specified business, but they may also provide services for the specified business.

If the other alternative slices exist, a terminal may send related information to the non-access stratum by means of the access stratum, so that the non-access stratum may determine slices able to be supported by a cell where the terminal is currently located and a neighboring cell according to the related information, then, the slices able to be supported by the cell where the terminal is currently located and the neighboring cell are selected from the other alternative slices to be used as adjusted expected slices to be sent to the access stratum, so that the adjusted expected slices may be supported by at least one of the cell where the terminal is currently located and the neighboring cell, and the terminal selects the cell able to support the adjusted expected slices to access.

In an example, the terminal may determine whether a suitable cell supporting the expected slice exists in the current cell and the neighboring cell firstly, and send the related information to the non-access stratum by means of the access stratum in a case of inexistence of the suitable cell and existence of the other alternative slices.

The terminal may select not to send the related information to the non-access stratum by means of the access stratum in the case of existence of the suitable cell.

In addition, the terminal may also select not to send the related information to the non-access stratum by means of the access stratum in the case of inexistence of the suitable cell and inexistence of the other alternative slices.

FIG. 7 is a schematic flow diagram of yet another information sending method shown according to an example of the disclosure. As shown in FIG. 7, the method further includes:

in step S701, an expected slice needed for a non-access stratum is determined; and
sending related information to the non-access stratum by means of an access stratum includes:
in step S702, related information of a suitable cell belonging to the expected slice in the slice is sent to the non-access stratum by means of the access stratum.

In an example, the non-access stratum may determine the needed expected slice according to its own needs and indicate the expected slice to the access stratum. For example, the non-access stratum may determine the slice that may provide corresponding services for the business as the expected slice according to the business that needs to be performed.

In this case, the terminal may determine slices supported by a current cell and a neighboring cell, determine the suitable slice belonging to the expected slice in the slices supported by the current cell and the neighboring cell and send the related information of the suitable slice to the non-access stratum.

Accordingly, the non-access stratum may precisely determine a condition of each cell supporting the expected slice, for example, which cells may support all expected slices, which cells may support part of expected slices, and which cells do not support the expected slice at all.

For example, the non-access stratum may determine whether part of expected slices supported by the cell may meet needs of providing services for business in a case of no cell supporting all the expected slices, but there being cells supporting part of expected slices.

For example, the expected slices are a slice a, a slice b and a slice c, a cell 1 supports the slice a and the slice c, a cell 2 supports the slice a and the slice b, the non-access stratum determines that at least slices a and c need to be supported to meet the needs of serving the business, and in this case, it may be determined that the cell 1 supports the slice a and the slice c according to the related information.

Accordingly, the expected slice may be adjusted, the adjusted expected slice is part of slices in originally expected slices, the adjusted expected slice may meet needs of providing services for the business, then, the adjusted expected slice may be sent to the access stratum, and the adjusted expected slice may be supported by at least one cell in the cell where the terminal is currently located and the neighboring cell, so that the terminal may select the cell that may support the adjusted expected slice to access, and the slice supported by the accessed cell may meet the needs of serving the business.

In an example, expected slices in all examples of the disclosure include but are not limited to a slice corresponding to allowed NSSAI, a slice corresponding to requested NASSAI, a slice corresponding to S-NSSAI corresponding to MO traffic, a slice in an operator-defined access category corresponding to the S-NSSAI, a slice corresponding to a slice index/slice group index, and any other slice corresponding to information that may uniquely indicate a slice/slice group, which may be specifically set according to needs.

It needs to be illustrated that the related information is used as a reference for the non-access stratum and is not used to determine the action of the non-access stratum, the non-access stratum may execute actions on the basis of the related information according to recording in the above example, however, the non-access stratum may also choose not to execute the actions according to the related information, which is specifically determined on the basis of implementation of the non-access stratum.

The disclosure further provides an information sending method, the information sending method shown by the present example may be suitable for a base station, the base station includes, but is not limited to a 4G base station, a 5G base station, a 6G base station and other base stations in a communication system, the base station may communicate with a terminal serving as a user device, and the terminal includes, but is not limited to a mobile phone, a tablet computer, a wearable device, a sensor, an internet of things device, and other communication apparatuses.

The information sending method may include the following steps:

related information of a slice supported by a cell corresponding to a base station is sent to a terminal.

In an example, the base station may send the related information in a broadcasting way, and may also send the related information by means of unlimited resource control stratum signaling.

According to the example of the disclosure, the base station sends the related information of the slice supported by the corresponding cell to the terminal, so that the terminal may determine a condition of the cell supporting the slice.

In an example, the related information includes at least one of:

an identifier of the slice;

an identifier of the cell supporting the slice;

signal quality of the cell supporting the slice;

whether a network allows to access the slice; and a priority of the slice.

In an example, the method further includes:

indication information is sent to the terminal to indicate the terminal to send the related information to a non-access stratum by means of an access stratum.

In an example, the base station may indicate the terminal by means of the indication information, after receiving the related information, the related information is sent to the non-access stratum by means of the access stratum, so that the non-access stratum may determine the slice with reference to the related information and provide the slice to the access stratum, so that the terminal may access the cell supporting the slice provided by the non-access stratum, thus facilitating the guarantee of the good communication effect.

Corresponding to the example of the above information sending method, the disclosure further provides an example of an information sending apparatus.

Figure 8:
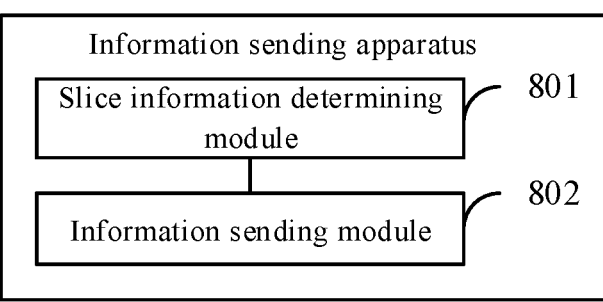
FIG. 8 is a schematic block diagram of an information sending apparatus shown according to an example of the disclosure.

FIG. 8 is a schematic block diagram of an information sending apparatus shown according to an example of the disclosure. The information sending apparatus shown by the present example may be suitable for a terminal, the terminal includes, but is not limited to a mobile phone, a tablet computer, a wearable device, a sensor, an internet of things device, and other communication apparatuses. The terminal may be used as a user device to communicate with a base station, and the base station includes, but is not limited to a 4G base station, a 5G base station, a 6G base station and other base stations in a communication system.

As shown in FIG. 8, the information sending apparatus may include the following steps:

a slice information determining module 801, configured to determine related information of a slice supported by a cell; and an information sending module 802, configured to send the related information to a non-access stratum by means of an access stratum.

In an example, the slice includes at least one of:

a slice supported by a cell where the terminal is currently located;

a remapping slice supported by the cell where the terminal is currently located;

a slice supported by a neighboring cell of the cell; and a remapping slice supported by the neighboring cell of the cell.

In an example, the related information includes at least one of:

an identifier of the slice;

an identifier of the cell supporting the slice;

signal quality of the cell supporting the slice;

whether a network allows to access the slice; and a priority of the slice.

In an example, the priority of the slice is determined on the basis of at least one of:

an indication of a base station;

a quantity of cells supporting the slice; and signal quality of the cell supporting the slice.

In an example, the information sending module is configured to send related information to the non-access stratum by means of the access stratum in response to determining an update of the related information.

In an example, the information sending module is configured to send related information of a slice supported by a reselected cell to the non-access stratum by means of the access stratum in response to the terminal residing in the reselected cell after cell reselection.

In an example, the apparatus further includes:

an expected slice determining module, configured to determine an expected slice needed for a non-access stratum.

The related information at least includes: whether a suitable cell supporting the expected slice exists in a cell where a terminal is currently located and a neighboring cell of the cell.

In an example, the apparatus further includes:

an expected slice determining module, configured to determine an expected slice needed for a non-access stratum.

The information sending module is configured to send related information to the non-access stratum by means of the access stratum in response to inexistence of a suitable cell supporting the expected slice in the cell where the terminal is currently located and the neighboring cell of the cell.

In an example, the apparatus further includes:

an expected slice determining module, configured to determine an expected slice needed for a non-access stratum; and an information sending module, configured to send related information to the non-access stratum by means of the access stratum in response to existence of other alternative slices needed for the non-access stratum besides the expected slice.

In an example, the apparatus further includes:

an expected slice determining module, configured to determine an expected slice needed for a non-access stratum; and an information sending module, configured to send related information of a suitable slice belonging to the expected slice in a slice to the non-access stratum by means of the access stratum.

The disclosure further provides an information sending apparatus, the information sending apparatus shown by present example may be suitable for a base station, the base station includes, but is not limited to a 4G base station, a 5G base station, a 6G base station and other base stations in a communication system, the base station may communicate with a terminal serving as a user device, and the terminal includes, but is not limited to a mobile phone, a tablet computer, a wearable device, a sensor, an internet of things device, and other communication apparatuses.

The information sending apparatus may include:

an information sending module, configured to send related information of a slice supported by a cell corresponding to a base station to a terminal.

In an example, the apparatus further includes:

an indication module, configured to send indication information to a terminal to indicate the terminal to send related information to a non-access stratum by means of an access stratum.

With respect to apparatuses in the above examples, a specific way of each module executing an operation has been described in detail in the examples of the relevant methods, which is not illustrated here in detail.

For apparatus examples, since they basically correspond to method examples, relevant points refer to part of the description of the method examples. The apparatus examples described above are merely schematic, where modules described as separate components may or may not be physically separate, and components shown as modules may or may not be physical modules, that is, may be located in one place or may be distributed to a plurality of network modules. Some or all of the modules may be selected according to the actual needs to realize the purpose of solutions of the present examples. Those ordinarily skilled in the art may understand and implement the examples without creative labor.

An example of the disclosure further provides a communication apparatus, including:

a processor; and a memory configured to store a computer program, where when the computer program is executed by the processor, the computer program implements an information sending method suitable for a terminal of any above example.

An example of the disclosure further provides a communication apparatus, including:

a processor; and a memory configured to store a computer program, where when the computer program is executed by the processor, the computer program implements an information sending method suitable for a base station of any above example.

An example of the disclosure further provides a computer readable storage medium, configured to store a computer program, and when the computer program is executed by a processor, the computer program implements steps of an information sending method suitable for a terminal of any above example.

An example of the disclosure further provides a computer readable storage medium, configured to store a computer program, and when the computer program is executed by a processor, the computer program implements steps of an information sending method suitable for a base station of any above example.

Figure 9:
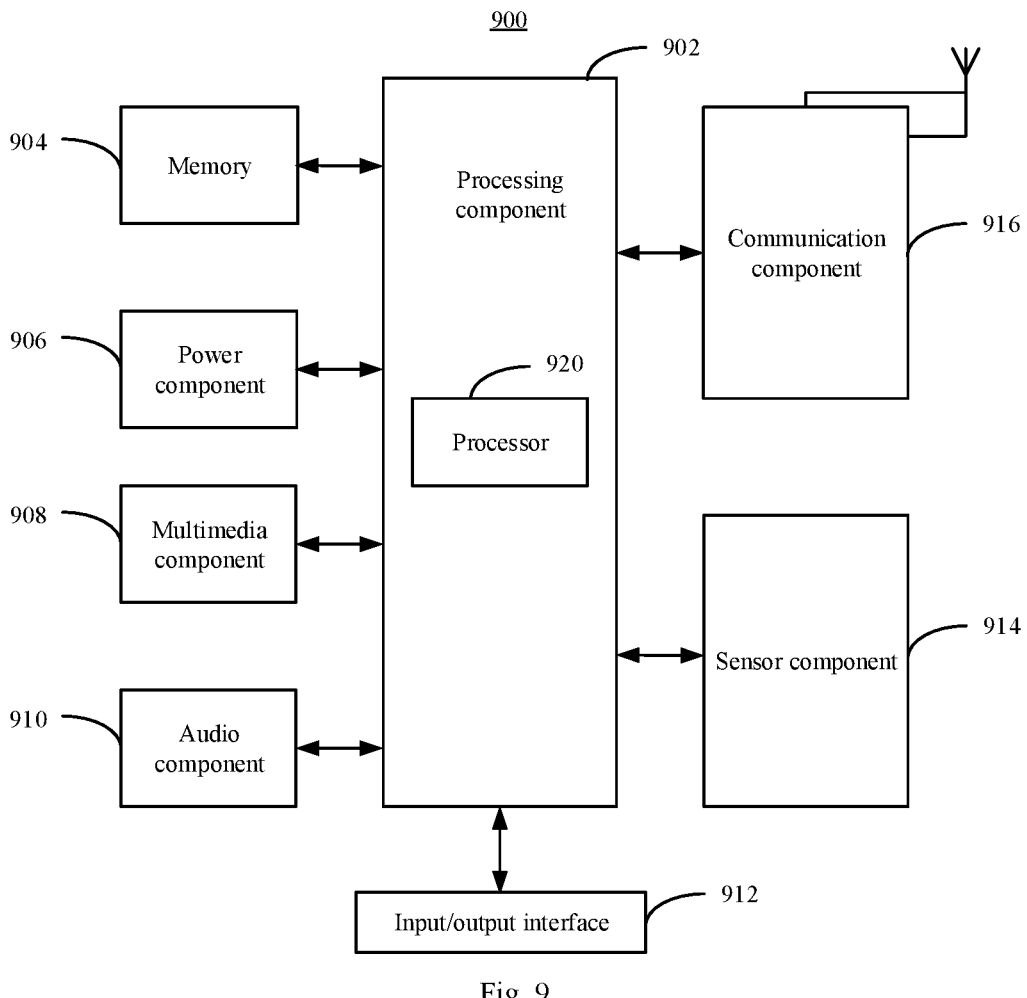
FIG. 9 is a schematic block diagram of an apparatus for information sending shown according to an example of the disclosure.

FIG. 9 is a schematic block diagram of an apparatus 900 for information sending shown according to an example of the disclosure. For example, the apparatus 900 may be a mobile phone, a computer, a digital broadcast terminal, a messaging device, a game console, a tablet device, a medical device, a fitness device, a personal digital assistant, etc.

Referring to FIG. 9, the apparatus 900 may include one or more of following components: a processing component 902, a memory 904, a power component 906, a multimedia component 908, an audio component 910, an input/output (I/O) interface 912, a sensor component 914, and a communication component 916.

The processing component 902 typically controls the overall operation of the apparatus 900, such as operations associated with display, telephone call, data communication, camera operation, and recording operation. The processing component 902 may include one or more processors 920 to execute instructions to complete all or part of the steps of the above information sending method suitable for the terminal. In addition, the processing component 902 may include one or more modules to facilitate interactions between the processing component 902 and other components. For example, the processing component 902 may include a multimedia module to facilitate the interaction between the multimedia component 908 and the processing component 902.

The memory 904 is configured to store various types of data to support operation on the apparatus 900. Examples of such data include instructions for any application program or methods operating on the apparatus 900, contact data, phone book data, messages, pictures, videos, etc. The memory 904 may be implemented by any type of volatile or non-volatile storage devices or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disc.

The power component 906 provides power to the various components of the apparatus 900. The power component 906 may include a power management system, one or more power supplies, and other components associated with generating, managing, and distributing power for the apparatus 900.

The multimedia component 908 includes a screen providing an output interface between the apparatus 900 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, slide, and gestures on the touch panel. The touch sensor may not only sense boundaries of a touch or slide action, but also detect the duration and pressure associated with the touch or slide action. In some examples, the multimedia component 908 includes a front camera and/or a rear camera. When the apparatus 900 is in an operation mode, such as a shooting mode or video mode, the front camera and/or the rear camera may receive external multimedia data. Each front camera and each rear camera may be a fixed optical lens system or have focal length and optical zoom capability.

The audio component 910 is configured to output and/or input audio signals. For example, the audio component 910 includes a microphone (MIC) that is configured to receive external audio signals when the apparatus 900 is in an operation mode, such as a call mode, a recording mode, and a speech recognition mode. The received audio signals may be further stored in the memory 904 or sent via the communication component 916. In some examples, the audio component 910 also includes a speaker for the output of the audio signals.

The I/O interface 912 provides an interface between the processing component 902 and a peripheral interface module, and the above peripheral interface module may be a keyboard, a click wheel, buttons, etc. These buttons may include but are not limited to a home button, a volume button, a start button, and a lock button.

The sensor component 914 includes one or more sensors configured to provide a status assessment of all aspects of the apparatus 900. For example, the sensor component 914 may detect an on/off state of the apparatus 900, and relative positioning of the components, for example, the component is a display and a keypad of the apparatus 900, and the sensor component 914 may also detect the change in the position of the apparatus 900 or one of the components of the apparatus 900, presence or absence of contact between the user and the apparatus 900, an orientation or acceleration/deceleration of the apparatus 900 and a temperature change of the apparatus 900. The sensor component 914 may include a proximity sensor configured to detect presence of nearby objects without any physical contact. The sensor component 914 may also include an optical sensor, such as a CMOS or CCD image sensors, configured to be used in imaging applications. In some examples, the sensor component 914 may also include an acceleration sensor, a gyroscope sensor, a magnetic sensor, a pressure sensor or a temperature sensor.

The communication component 916 is configured to facilitate wired or wireless communication between the apparatus 900 and other devices. The apparatus 900 may access a wireless network based on a communication standard, such as WiFi, 2G or 3G, 4G LTE, 5G NR or a combination of them. In an example, the communication component 916 receives broadcast signals or broadcast-related information from an external broadcast management system via a broadcast channel. In an example, the communication component 916 also includes a near-field communication (NFC) module to promote short-range communication. For example, the NFC module may be realized based on a radio frequency identification (RFID) technology, an infrared data association (IrDA) technology, an ultra wide-band (UWB) technology, a Bluetooth (BT) technology and other technologies.

In an example, the apparatus 900 may be implemented by one or more application specific integrated circuits (ASICs), digital signal processors (DSPs), digital signal processing devices (DSPDs), programmable logic devices (PLDs), field programmable gate array (FPGAs), controllers, microcontrollers, microprocessors, or other electronic elements, configured to perform the above information sending method suitable for the terminal.

In an example, a non-transient computer readable storage medium including instructions is also provided, such as a memory 904 including the instructions, and the above instructions may be executed by the processor 920 of the apparatus 900 to complete the above information sending method for the terminal. For example, the non-transient computer readable storage medium may be an ROM, a random access memory (RAM), a CD-ROM, a magnetic tape, a floppy disk, an optical data storage device, etc.

Figure 10:
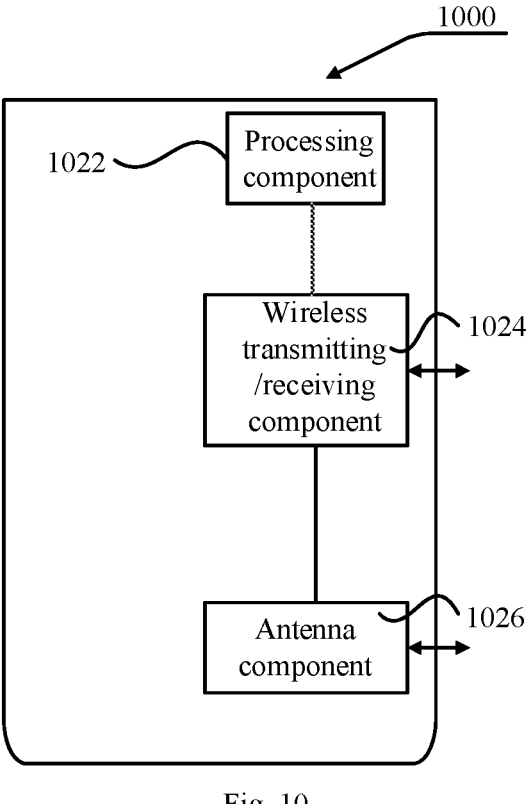
FIG. 10 is a schematic block diagram of an apparatus for information sending shown according to an example of the disclosure.

As shown in FIG. 10, FIG. 10 is a schematic block diagram of an apparatus 1000 for information sending shown according to an example of the disclosure. The apparatus 1000 may be provided as a base station, referring to FIG. 10, the apparatus 1000 includes a processing component 1022, a wireless transmitting/receiving component 1024, an antenna component 1026, and a signal processing portion specific to a wireless interface, the processing component 1022 may further include one or more processors, and one processor of the processing component 1022 may be configured to implement the above information sending method suitable for the base station of any above example.

After considering the specification and practicing the disclosure disclosed here, those skilled in the art will easily think of other implementation solutions of the disclosure. The disclosure is intended to cover any variation, use or adaptation changes of the disclosure, these variation, use or adaptation changes follow general principles of the disclosure and include common knowledge or customary technical means in the technical field not disclosed in the disclosure.

The specification and the examples are merely regarded as examples, and the true scope and spirit of the disclosure are indicated by the claims below.

It shall be understood that the disclosure is not limited to a precise structure already described above and shown in the accompanying drawings, and various modifications and changes may be performed without departing from the scope of the disclosure. The scope of the disclosure is limited only by the appended claims.

It needs to be noted that in the disclosure, relational terms such as first and second are merely used to distinguish one entity or operation from another entity or operation and do not necessarily require or imply any such actual relation or order between these entities or operations. Terms "include", "contain" or any other variation thereof are intended to cover non-exclusive inclusion so that a process, method, article or device including a series of elements includes not only those elements, but also other elements not expressly listed, or elements inherent to such process, method, article or device. In the absence of further restrictions, an element qualified by the sentence "including a . . . " does not exclude the existence of additional identical elements in a process, method, article or device including the element.

The above provides a detailed introduction to the method and apparatus provided by the examples of the disclosure. In the disclosure, specific examples are used to explain the principle and implementation of the disclosure. The illustration of the above examples is only used to help understand the method of the disclosure and its core ideas. At the same time, for those ordinarily skilled in the art, according to the idea of disclosure, there will be changes in the specific implementation and scope of application, and in summary, the content of the present specification should not be understood as a restriction on the disclosure.

In view of this, examples of the disclosure provide an information sending method, an information sending apparatus, a communication apparatus and a computer readable storage medium, to solve technical problems in the related art.

According to a first aspect of the examples of the disclosure, an information sending method is provided and performed by a terminal, and the method including:

determining related information of a slice supported by a cell; and sending the related information to a non-access stratum by means of an access stratum.

According to a second aspect of the examples of the disclosure, an information sending method is provided and performed by a base station, and the method including:

sending related information of a slice supported by a cell corresponding to the base station to a terminal.

According to a third aspect of the examples of the disclosure, an information sending apparatus is provided and performed by a terminal, and the apparatus including:

a slice information determining module, configured to determine related information of a slice supported by a cell; and an information sending module, configured to send the related information to a non-access stratum by means of an access stratum.

According to a fourth aspect of the examples of the disclosure, an information sending apparatus is provided and performed by a base station, and the apparatus including:

an information sending module, configured to send related information of a slice supported by a cell corresponding to the base station to a terminal.

According to a fifth aspect of the examples of the disclosure, a communication apparatus is provided and including:

a processor; and a memory configured to store a computer program, where when the computer program is executed by the processor, the computer program implements an information sending method suitable for a terminal.

According to a sixth aspect of the examples of the disclosure, a communication apparatus is provided and including:

a processor; and a memory configured to store a computer program, where when the computer program is executed by the processor, the computer program implements an information sending method suitable for a base station.

According to a seventh aspect of the examples of the disclosure, a computer readable storage medium is provided and configured to store a computer program, and when the computer program is executed by a processor, the computer program implements steps of an information sending method suitable for a terminal.

According to an eighth aspect of the examples of the disclosure, a computer readable storage medium is provided and configured to store a computer program, and when the computer program is executed by a processor, the computer program implements steps of an information sending method suitable for a base station.

According to the examples of the disclosure, the terminal can determine related information of a slice supported by a cell, such as an identifier of the slice, an identifier of the cell supporting the slice, and signal quality of the cell supporting the slice, and then can send the related information to a non-access stratum by means of an access stratum, so that the non-access stratum can determine the slice with reference to the related information and provide the slice to the access stratum, so that the terminal can access the cell supporting the slice provided by the non-access stratum, thus facilitating the guarantee of a better communication effect.

What is claimed is:

1. An information sending method, performed by a terminal, and comprising:

determining related information of a slice supported by a cell; and sending the related information to a non-access stratum by means of an access stratum, wherein the related information comprises a priority of the slice, wherein the priority of the slice is determined based on a quantity of cells supporting the slice, and wherein the non-access stratum is configured to indicate a slice with a high priority to the access stratum, and the access stratum is configured to access the cell based on the slice with the high priority.

2. The information sending method according to claim 1, wherein the slice comprises at least one of the following:

a slice supported by a cell where the terminal is currently located;

a remapping slice supported by the cell where the terminal is currently located;

a slice supported by a neighboring cell of the cell; or a remapping slice supported by the neighboring cell of the cell.

3. The information sending method according to claim 1, wherein the related information further comprises at least one of the following:

an identifier of the slice;

an identifier of the cell supporting the slice;

signal quality of the cell supporting the slice; or whether a network allows to access the slice.

4. The information sending method according to claim 3, wherein the priority of the slice is further determined based on at least one of the following:

an indication of a base station; or signal quality of the cell supporting the slice.

5. The information sending method according to claim 1, wherein sending the related information to the non-access stratum by means of the access stratum comprises:

sending, in response to determining an update of the related information, the related information to the non-access stratum by means of the access stratum.

6. The information sending method according to claim 1, wherein sending the related information to the non-access stratum by means of the access stratum comprises:

sending, in response to a terminal residing in a reselected cell after cell reselection, related information of a slice supported by the reselected cell to the non-access stratum by means of the access stratum.

7. The information sending method according to claim 1, further comprising:

determining an expected slice needed for the non-access stratum; and the related information at least comprising: whether a suitable cell supporting the expected slice exists in a cell where a terminal is currently located and a neighboring cell of the cell.

8. The information sending method according to claim 1, further comprising:

determining an expected slice needed for the non-access stratum; and sending the related information to the non-access stratum by means of the access stratum comprising:

sending, in response to inexistence of a suitable cell supporting the expected slice in a cell where a terminal is currently located and a neighboring cell of the cell, the related information to the non-access stratum by means of the access stratum.

9. The information sending method according to claim 1, further comprising:

determining an expected slice needed for the non-access stratum; and sending the related information to the non-access stratum by means of the access stratum comprising:

sending, in response to existence of other alternative slices needed for the non- access stratum besides the expected slice, the related information to the non-access stratum by means of the access stratum.

10. The information sending method according to claim 1, further comprising:

determining an expected slice needed for the non-access stratum; and sending the related information to the non-access stratum by means of the access stratum comprising:

sending related information of a suitable slice belonging to the expected slice in the slice to the non-access stratum by means of the access stratum.

11. An information sending method, performed by a base station, and comprising:

sending related information of a slice supported by a cell corresponding to the base station to a terminal, wherein the related information is sent to a non-access stratum of the terminal by an access stratum of the terminal, and the related information comprises a priority of the slice, wherein the priority of the slice is determined based on a quantity of cells supporting the slice, and wherein the non-access stratum is configured to indicate a slice with a high priority to the access stratum, and the access stratum is configured to access the cell based on the slice with the high priority.

12. The information sending method according to claim 11, further comprising:

sending indication information to the terminal to indicate the terminal to send the related information to the non-access stratum by means of the access stratum.

13. A base station, comprising:

a processor; and a memory configured to store a computer program, wherein in response to determining that the computer program is executed by the processor, the computer program implements the information sending method according to claim 11.

14. A terminal, comprising:

a processor; and a memory configured to store a computer program, wherein in response to determining that the computer program is executed by the processor, the computer program implements:

determining related information of a slice supported by a cell; and sending the related information to a non-access stratum by means of an access stratum, wherein the related information comprises a priority of the slice, wherein the priority of the slice is determined based on a quantity of cells supporting the slice, and wherein the non-access stratum is configured to indicate a slice with a high priority to the access stratum, and the access stratum is configured to access the cell based on the slice with the high priority.

15. The terminal according to claim 14, wherein the slice comprises at least one of the following:

a slice supported by a cell where the terminal is currently located;

a remapping slice supported by the cell where the terminal is currently located;

a slice supported by a neighboring cell of the cell; or a remapping slice supported by the neighboring cell of the cell.

16. The terminal according to claim 14, wherein the related information further comprises at least one of the following:

an identifier of the slice;

an identifier of the cell supporting the slice;

signal quality of the cell supporting the slice; or whether a network allows to access the slice.

17. The terminal according to claim 16, wherein the priority of the slice is further determined based on at least one of the following:

an indication of a base station; or signal quality of the cell supporting the slice.

18. The terminal according to claim 14, the computer program further implements:

sending, in response to determining an update of the related information, the related information to the non-access stratum by means of the access stratum.

19. The terminal according to claim 14, the computer program further implements:

sending, in response to a terminal residing in a reselected cell after cell reselection, related information of a slice supported by the reselected cell to the non-access stratum by means of the access stratum.

20. The terminal according to claim 14, the computer program further implements:

determining an expected slice needed for the non-access stratum; and the related information at least comprising: whether a suitable cell supporting the expected slice exists in a cell where a terminal is currently located and a neighboring cell of the cell.

* * * * *